US012756750B2

(12) United States Patent
Ma et al.

(10) Patent No.: US 12,756,750 B2
(45) Date of Patent: Oct. 6, 2026

(54) REAL-TIME TRANSPORT PROTOCOL HEADER EXTENSION FOR THE REMAINING PROTOCOL DATA UNIT SET SIZE

(71) Applicant: QUALCOMM Incorporated, San Diego, CA (US)

(72) Inventors: Liangping Ma, San Diego, CA (US); Imed Bouazizi, Celina, TX (US); Thomas Stockhammer, Bergen (DE); Nikolai Konrad Leung, San Francisco, CA (US); Louis Joseph Kerofsky, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 104 days.

(21) Appl. No.: 18/798,544

(22) Filed: Aug. 8, 2024

(65) Prior Publication Data

US 2025/0055899 A1 Feb. 13, 2025

Related U.S. Application Data

(60) Provisional application No. 63/641,251, filed on May 1, 2024, provisional application No. 63/518,419, filed on Aug. 9, 2023.

(51) Int. Cl.
*H04L 65/70* (2022.01)
*H04L 65/65* (2022.01)

(52) U.S. Cl.
CPC .............. *H04L 65/70* (2022.05); *H04L 65/65* (2022.05)

(58) Field of Classification Search
CPC ....... H04L 65/60; H04L 65/61; H04L 65/611; H04L 65/612; H04L 65/613; H04L 65/65;
(Continued)

(56) References Cited

U.S. PATENT DOCUMENTS

| | | | | |
|---|---|---|---|---|
| 9,843,655 | B1 * | 12/2017 | Govindassamy | H04L 69/22 |
| 2024/0259454 | A1 * | 8/2024 | Kammachi Sreedhar | H04L 69/22 |

(Continued)

FOREIGN PATENT DOCUMENTS

WO 2015026132 A1 2/2015

OTHER PUBLICATIONS

3GPP : "3rd Generation Partnership Project, Technical Specification Group Services and System Aspects, Management and Orchestration, 5G Performance Measurements (Release 19)", 3GPP TS 28.552, V19.1.0, Sep. 2024, 406 Pages.

(Continued)

*Primary Examiner* — Rachel J Hackenberg
(74) *Attorney, Agent, or Firm* — Shumaker & Sieffert, P.A.

(57) ABSTRACT

An example device includes one or more memories configured to store a current real-time transport protocol (RTP) packet and one or more processors. The one or more processors are configured to determine a protocol data unit (PDU) set, the PDU set comprising a plurality of PDUs, each PDU comprising a corresponding RTP packet. The one or more processors are configured to determine, for a current RTP packet of the PDU set, a remaining PDU set size, the remaining PDU set size being indicative of a size of the sum of a remainder of the PDUs of the PDU set. The one or more processors are configured to transmit the current RTP packet including an RTP header extension comprising a value indicative of the remaining PDU set size.

27 Claims, 9 Drawing Sheets

(58) Field of Classification Search
CPC ......... H04L 65/70; H04L 65/75; H04L 65/80; H04L 65/764; H04L 65/762; H04L 65/756; H04L 65/752; H04L 69/22; H04L 69/16; H04L 69/161; H04L 69/322; H04L 69/164
See application file for complete search history.

(56) References Cited

U.S. PATENT DOCUMENTS

| | | | | |
|---|---|---|---|---|
| 2024/0373280 | A1* | 11/2024 | Karampatsis | H04L 45/74 |
| 2025/0008508 | A1* | 1/2025 | Wu | H04W 28/0278 |

OTHER PUBLICATIONS

3GPP: "3rd Generation Partnership Project, Technical Specification Group Services and System Aspects, 5G Real-Time Media Transport Protocol Configurations (Release 18)", 3GPP TS 26.522, V0.1.0, May 2023, 21 Pages.
ETSI : "Digital Cellular Telecommunications System (Phase 2+), Universal Mobile Telecommunications System (UMTS), Technical Specification Group Working Methods (3GPP TR 21.900 Version 11.0.1 Release 11)", ETSI TR 121 900 V11.0.1, Jun. 2013, 37 Pages.
ETSI: "5G, 5G Real-time Media Transport Protocol Configurations (3GPP TS 26.522 Version 18.0.0 Release 18)", ETSI TS 126 522 V18.0.0, May 2024, 38 Pages.
Fielding R., et al., "Hypertext Transfer Protocol—HTTP/1.1", Network Working Group, IETF RFC 2616, Jun. 1999, pp. 1-176.
International Search Report and Written Opinion—PCT/US2024/041655—ISA/EPO—Oct. 18, 2024 12 Pages.
Qualcomm Incorporated: "[FS_5G_RTP_Ph2] PDU Set Size Information Correction by Indicating the Remaining PDU Set Size in RTP Header Extnesion", Post SA4#127-bis-e RTC Telco, S4aR240xxx, May 6, 2024, 3 Pages.

* cited by examiner

INDICATED PDU SIZE OF PDU1 = R-PSSize_0 – R-PSSize_1

PDU SIZE ERROR = (ACTUAL PDU SIZE OF PDU1) – (INDICATED PDUSIZE OF PDU 1)

ACTUAL PSSize = (INDICATED PSSize) – (PDU SIZE ERROR) X (NUMBER OF PDUS IN THE PDU SET)

INDICATED PDU SIZE OF PDU1 = R-PSSize_0 – R-PSSize_1

PDU SIZE ERROR = (INDICATED PDU SIZE OF PDU1) – (OBSERVED PDU SIZE OF PDU 1)

ACTUAL PSSize = (INDICATED PSSize) – (PDU SIZE ERROR) X (NUMBER OF PDUS IN THE PDU SET)

REAL-TIME TRANSPORT PROTOCOL HEADER EXTENSION FOR THE REMAINING PROTOCOL DATA UNIT SET SIZE

This application claims the benefit of U.S. Provisional Patent Application 63/518,419, filed on Aug. 9, 2023, and U.S. Provisional Patent Application 63/641,251, filed on May 1, 2024, the entire content of both of which is incorporated by reference.

TECHNICAL FIELD

This disclosure relates to transport of data, such as RTP/SRTP packets.

BACKGROUND

The use of applications, such as video and/or extended reality (XR) applications, may involve the transportation of data in the form of packets over one or more networks between computing devices. Such packets may be referred to as protocol data units (PDUs) and may be grouped into PDU sets which may be associated with particular flows or sessions.

SUMMARY

In data networks, packets, such as Real-time Transport Protocol (RTP) packets may be used to transport data, such as video and/or XR data from a first computing device, such as a video or XR device, to another computing device, such as an edge application server. Data may be transmitted in protocol data unit (PDU) sets which may make up data flows or sessions between such computing devices. Currently, according to some standards and implementations, each of the RTP packets of a PDU set may include in a header a value indicative of a PDU Set Size (PSSize). As such, each of the RTP packets of the same PDU set includes this identical information, which may be wasteful of bandwidth.

This disclosure describes techniques for providing more useful information in the RTP header rather than repeating the same PSSize for each RTP packet of the same PDU set. In particular, this disclosure describes techniques for sending, in an RTP packet header, a value indicative of a remaining PDU Set Size or (R-PSSize).

For example, a first RTP packet of a PDU set may include, in a header, a value indicative of the PSSize, as all PDUs of the PDU set are available. Each of the following RTP packets of the PDU set may include a decremented value indicating how much remaining data is available for the PDU set. As such, useful information may be included in each of the RTP packets of a PDU set in place of the repeated information of PSSize. In a first example, a network may use such R-PSSize information for network resource allocation. In a second example, a network may use the R-PSSize information to correct the PSSize indicated by the application sender.

In one example, a method includes: determining a protocol data unit (PDU) set, the PDU set comprising a plurality of PDUs, each PDU comprising a corresponding real-time transport protocol (RTP) packet; determining, for a current RTP packet of the PDU set, a remaining PDU set size, the remaining PDU set size being indicative of a size of a sum of a remainder of the PDUs of the PDU set; and transmitting the current RTP packet, the current RTP packet comprising an RTP header extension comprising a value indicative of the remaining PDU set size.

In another example, a method includes: receiving, by a first computing device, a current real-time transport protocol (RTP) packet, the current RTP packet comprising a protocol data unit (PDU) of a PDU set and comprising an RTP header extension comprising a value indicative of a remaining PDU set size, the remaining PDU set size being indicative of a size of a sum of a remainder of the PDUs of the PDU set; and allocating, by the first computing device, resources for the remainder of the PDUs based on the remaining PDU set size.

In another example, a computing device includes: one or more memories configured to store a real-time transport protocol (RTP) packet; and one or more processors coupled to the one or more memories, the one or more processors being configured to: determine a protocol data unit (PDU) set, the PDU set comprising a plurality of PDUs, each PDU comprising a corresponding RTP packet; determine, for a current RTP packet of the PDU set, a remaining PDU set size, the remaining PDU set size being indicative of a size of a sum of a remainder of the PDUs of the PDU set; and transmit the current RTP packet, the current RTP packet comprising an RTP header extension comprising a value indicative of the remaining PDU set size In another example, a computing device includes: one or more memories configured to store a real-time transport protocol (RTP) packet; and one or more processors coupled to the one or more memories, the one or more processors being configured to: receive a current RTP packet, the current RTP packet comprising a protocol data unit (PDU) of a PDU set and comprising an RTP header extension comprising a value indicative of a remaining PDU set size, the remaining PDU set size being indicative of a size of a sum of a remainder of the PDUs of the PDU set; and allocate resources for the remainder of the PDUs based on the remaining PDU set size.

The details of one or more examples are set forth in the accompanying drawings and the description below. Other features, objects, and advantages will be apparent from the description and drawings, and from the claims.

DETAILED DESCRIPTION

In general, this disclosure describes techniques for tracking a remaining set size of a PDU set to be transmitted. More particularly, this disclosure describes techniques for including, in an RTP header extension, an indication of a remaining PDU set size yet to be transmitted (e.g., the size of the remainder of the PDU set to be transmitted).

A PDU set is a set of PDUs. For example, a device may transmit information, such as a video frame (e.g., a video picture), that may be too large to fit into a single PDU. As such, information associated with the video frame may be split up into a plurality of PDUs. These plurality of PDUs containing the information for the video frame may make up a PDU set. While a PDU set is described with respect to a single video frame, in some examples, the PDU set may include PDUs having information for less than a single video frame (e.g., for one or more slices of a video frame) or for more than a single video frame (e.g., for multiple video frames representing different views of a multi-view video).

Currently, the PSSize field exists in an RTP packet header extension in which a device may transmit an indication of the size of the PDU set. In this disclosure, a field may also be referred to as an element. However, if this PSSize field is utilized, the device will transmit this same size information with every PDU in the PDU set, which is a waste of bandwidth. A device or node that receives the transmitted information (e.g., the PSSize field), may calculate the remaining PDU set size (e.g., the size of the remainder of the PDU set to be transmitted) by saving an indication of the PDU set size sent by the transmitting device to the receiving device (e.g., from the PSSize field) and subtract, therefrom, a size of each additional received PDU of the PDU set while receiving each such PDU. The receiving device may do so for resource allocation purposes. For example, the receiving device may prioritize or allocate more resources for packets that are last packets of a PDU set or packets near the end of a PDU set. When the receiving device is a device handling a large number of packet flows, e.g., a gNodeB or base station, tracking the remaining PDU set size for all flows may be particularly burdensome. As such, it may be desirable to track the remaining PDU set size on the sending device, which may handle a lower number of packet flows, and transmit such information to the receiving device. Such information would not be duplicative and may reduce a processing burden on the receiving device.

Figure 1A:
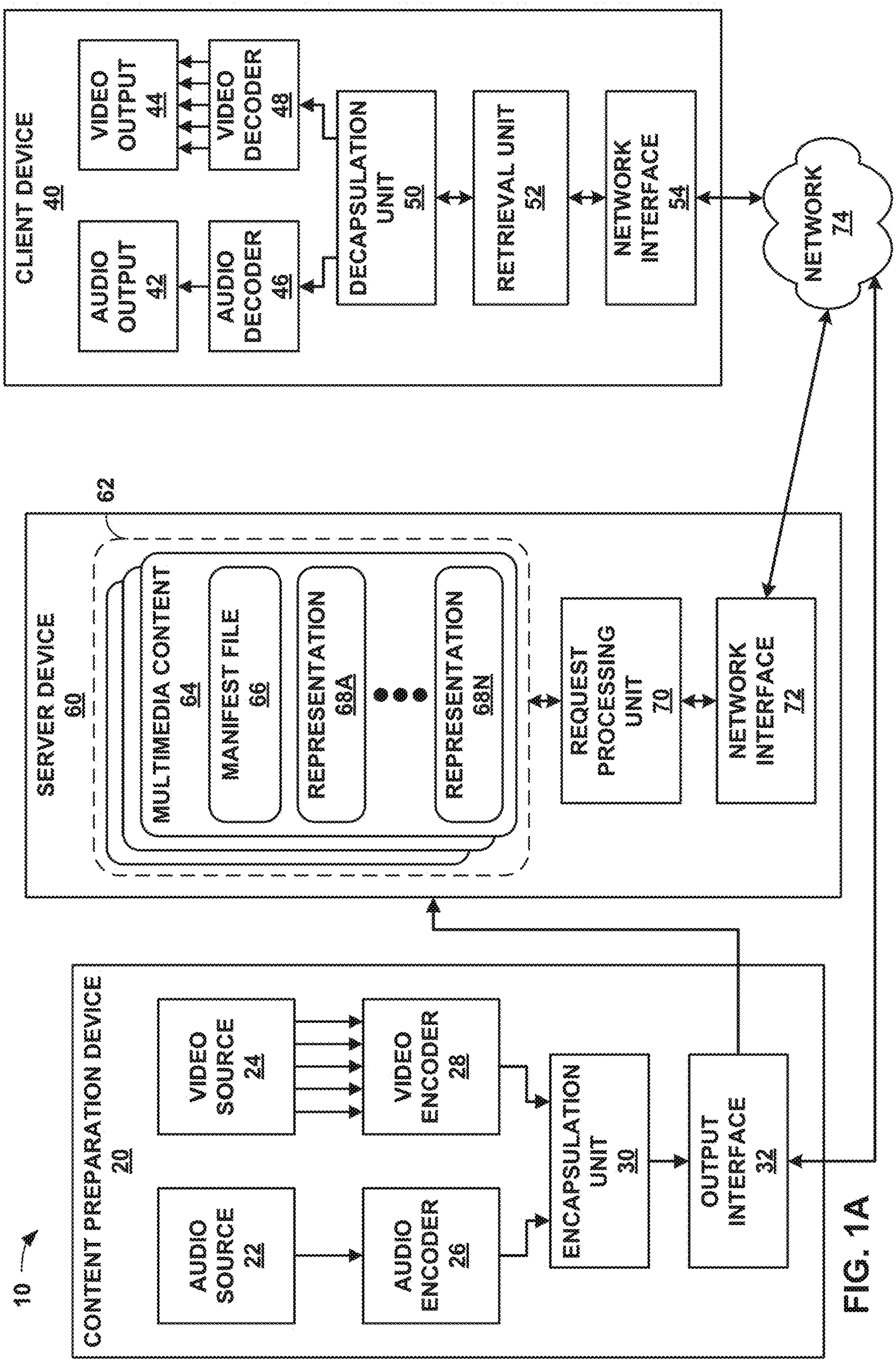
FIG. 1A is a block diagram illustrating an example system that implements techniques for streaming media data over a network.

FIG. 1A is a block diagram illustrating an example system 10 that implements techniques for streaming media data over a network. In this example, system 10 includes content preparation device 20, server device 60, and client device 40. Server device 60 may be a video server, an XR application server, or the like. Client device 40 and server device 60 are communicatively coupled by network 74, which may comprise a wireless wide area network, a wireless local area network, the Internet, and/or the like. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1A, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1A, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1A, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. In some examples, request processing unit 70 may receive network requests from client device 40 in the form of RTP packets and may deliver content, such as video or XR application content, to client device 40 in the form of RTP packets. These RTP packets may be PDUs of a PDU set, as described in certain industry standards, such as 3GPP TS 26.552. A PDU may be a unit of information transmitted between devices (e.g., client device 40 and server device 60), via or within a network, such as network 74. A PDU set may be a set of such PDUs. The PDUs of a PDU set may be related in some way, such as being of a same video frame.

Additionally, or alternatively, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally, or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1A, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bit rate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

The example of FIG. 1A describes the use of RTP, DASH, and HTTP-based streaming for purposes of example. However, it should be understood that other types of protocols may be used to transport media data. For example, request processing unit 70 and retrieval unit 52 may be configured to operate according to Real-time Streaming Protocol (RTSP), or the like, and use supporting protocols such as Session Description Protocol (SDP) or Session Initiation Protocol (SIP).

Figure 1B:
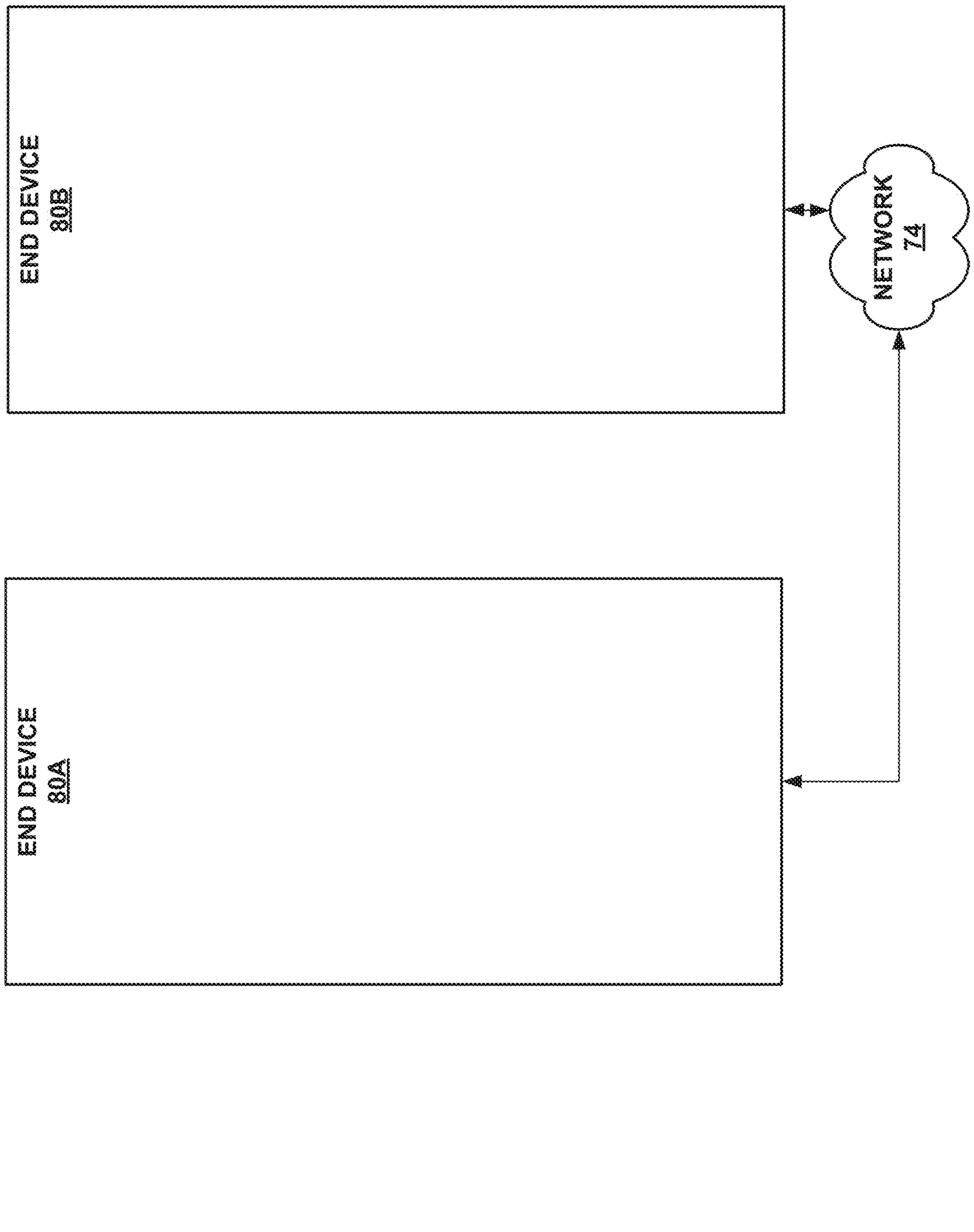
FIG. 1B is a block diagram illustrating another example system that implements techniques for streaming media data over a network.

FIG. 1B is a block diagram illustrating another example system that implements techniques for streaming media data over a network. FIG. 1B is similar to the example of FIG. 1A, but FIG. 1B includes two end devices, rather than a client device and a server device. For example, each end device 80A and 80B of system 10B may be configured to both consume content from and provide content to the other of end device 80A and 80B. The system of FIG. 1B may implement the techniques disclosed herein.

Figure 2:
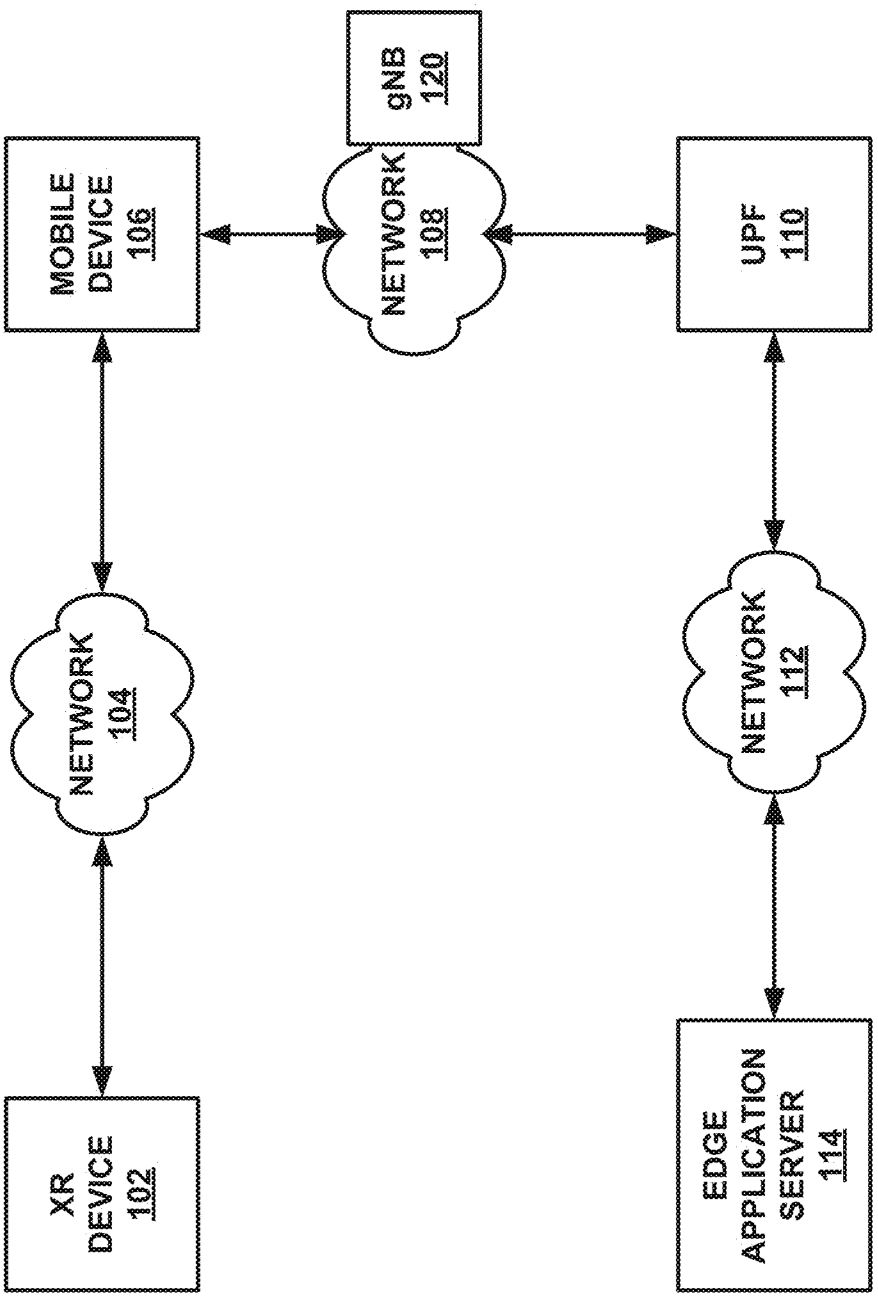
FIG. 2 is a block diagram illustrating an end-to-end XR system in which data packets traverse more than one network.

FIG. 2 is a block diagram illustrating an end-to-end XR system in which data packets traverse more than one network. While the example of FIG. 2 depicts XR device 102, in some examples, the end-to-end system is a video system and XR device 102 is a video device. XR device 102, which may be an example of client device 40 or a portion thereof, may be coupled to network 104. In some examples, XR device 102 may include XR glasses or an XR headset configured to deliver XR content to a user. In some examples, network 104 may include a wireless local area network, such as a Wi-Fi network. In some examples, network 104 may include multiple networks, such as a Wi-Fi network cascaded with an Ethernet.

Mobile device 106, which may be an example of client device 40 or a portion thereof, may be coupled to network 104 and network 108. Network 108 may include a wireless wide area network, such as a 5G network. Network 108 may include gNodeB (gNB) 120. gNB 120 may be a node in network 108 that provides connectivity between mobile device 106 and/or user plane function (UPF) 110 and an evolved packet core of network 108. For example, gNB 120 may control or orchestrate the allocation of network resources of network 108 for use by mobile device 106 and/or UPF 110, for example, in exchanging RTP packets, such as RTP packets of a PDU set.

UPF 110 may be coupled to network 108 and network 112. Network 112 may include the Internet. In some examples, Network 112 may also include one or more local networks. Edge application server 114, which may be an example of server device 60, may be coupled to network 112 and to content preparation device 20 (not shown in FIG. 2). As such, an end-to-end connection between XR device 102 and edge application server 114 may traverse a plurality of networks, network 104, network 108, and network 112.

Figure 3:
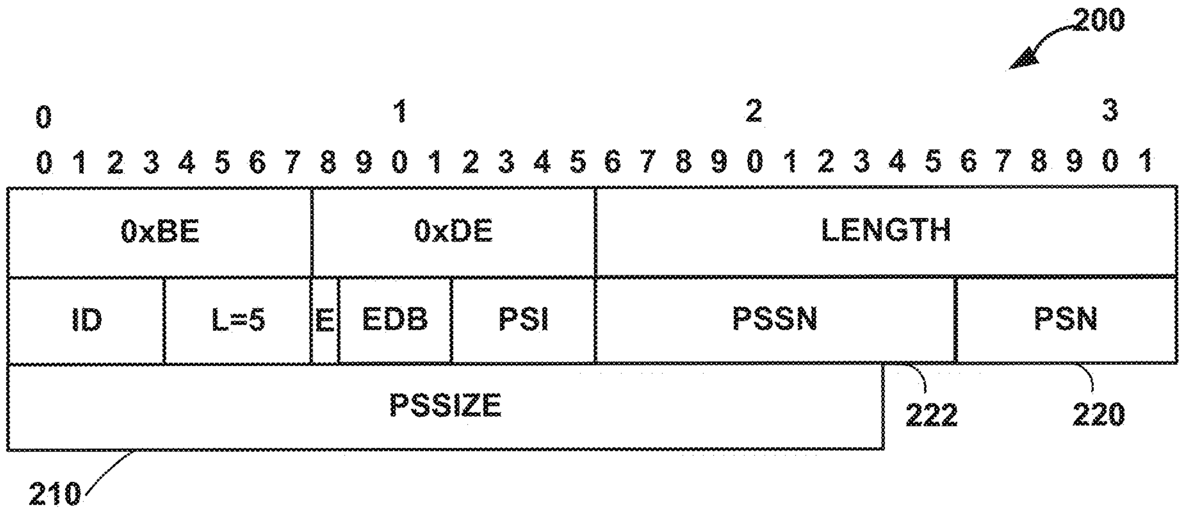
FIG. 3 is a conceptual diagram illustrating an example RTP header extension including a PSSize element.

FIG. 3 is a conceptual diagram illustrating an example RTP header extension including a PSSize element. RTP header extension 200 may include a PSSize element 210 which may be a 24-bit value representing the total size of all PDUs in a PDU set of which the packet including RTP header extension 200 is a member. In some examples, PSSize is set forth in terms of a number of bytes.

According to 3GPP TS 26.552, a value of the PDU Set Size (PSSize) of a PDU set can be carried in an RTP header extension (e.g., RTP header extension 200) to allow a radio access network (RAN) (via a UPF (e.g., UPF 110)) to facilitate resource allocation in the RAN. For example, UPF 110 may use the value represented in PSSize element 210 for resource allocation purposes in network 112. Similarly, a gNodeB (gNB) 120 of network 108 may use the value represented in PSSize element 210 for resource allocation purposes in network 108.

For example, in 3GPP TS 26.552 v0.0.21, a PSSize is defined as "PDU Set Size [PSSize] (24 bits): The PDU Set Size indicates the total size of all PDUs of the PDU Set to which this PDU belongs. This field is optional and subject to an SDP [session description protocol] signaling offer/answer negotiation, where the Application Server may indicate whether it will be able to provide the size of the PDU Set for that RTP stream. If not enabled, the field should not be present. If enabled, but the Application Server is not able to determine the PDU Size for a particular PDU Set, it should set the value to 0 in all PDUs of that PDU Set. In some examples, the PSSize shall indicate the size of a PDU Set including RTP/UDP/IP header encapsulation overhead of its corresponding PDUs or the sum of RTP payload sizes of all PDUs present in a PDU Set. The PSSize is expressed in bytes. NOTE 4: This field may be optionally present given the signaling of the 'pdu-set-size' extension attribute in the SDP offer/answer negotiation as per Clause 4.4.2.5."

RTP header extension 200 may include a PDU Sequence Number within a PDU Set (PSN) field 220. PSN 220 may be 6 bits in length. PSN 220 may represent a "sequence number of the current PDU within the PDU Set. The PSN shall be set to 0 for the first PDU in the PDU Set and incremented monotonically for every PDU in the PDU Set in the order of transmission from the sender." RTP header extension 200 may include a PDU Set Sequence Number (PSSN) field 222. PSSN field 222 may be 10 bits in length. PSSN field 222 may represent a "sequence number of the PDU Set to which the current PDU belongs, acting as a 10-bit numerical identifier for the PDU Set. The PSSN shall be incremented monotonically by 1 for each subsequent PDU Set."

The presence of the PSSize field in RTP header extension 200 is configured at the application session level (e.g., through SDP) between devices. This means that if the configuration indicates the presence of the PSSize field, then all RTP packets of the PDU Set will carry the PSSize field.

The values of the PSSize field in the RTP packets belonging to the same PDU Set are the same, as each RTP packet having a PSSize field that is part of a PDU Set will be specifying the same size of the same set. This repetition is a waste of bandwidth and processing resources. For example, network bandwidth is wasted transporting the same PSSize value in each RTP header extension of each PDU in a given PDU set.

According to the techniques of this disclosure, instead, of repeating the same information of the size of a PDU set for each PDU of a PDU set, the RTP sender may provide more updated information about the PDU Set, for example, the remaining PDU Set Size or (R-PSSize). This frees network entities, such as gNB 120 or UPF 110, from bookkeeping or tracking how much of a PDU Set has been delivered. The aggregated bookkeeping of all PDU sets of all connected devices may significantly increase the computing demand and complexity for gNB 120 or UPF 110. Maintaining this information (e.g., bookkeeping) at the RTP sender is more manageable, because the RTP sender may only maintain such information for one session, rather than all sessions that may be occurring in gNB 120 or UPF 110 associated with numerous devices.

Figure 4:
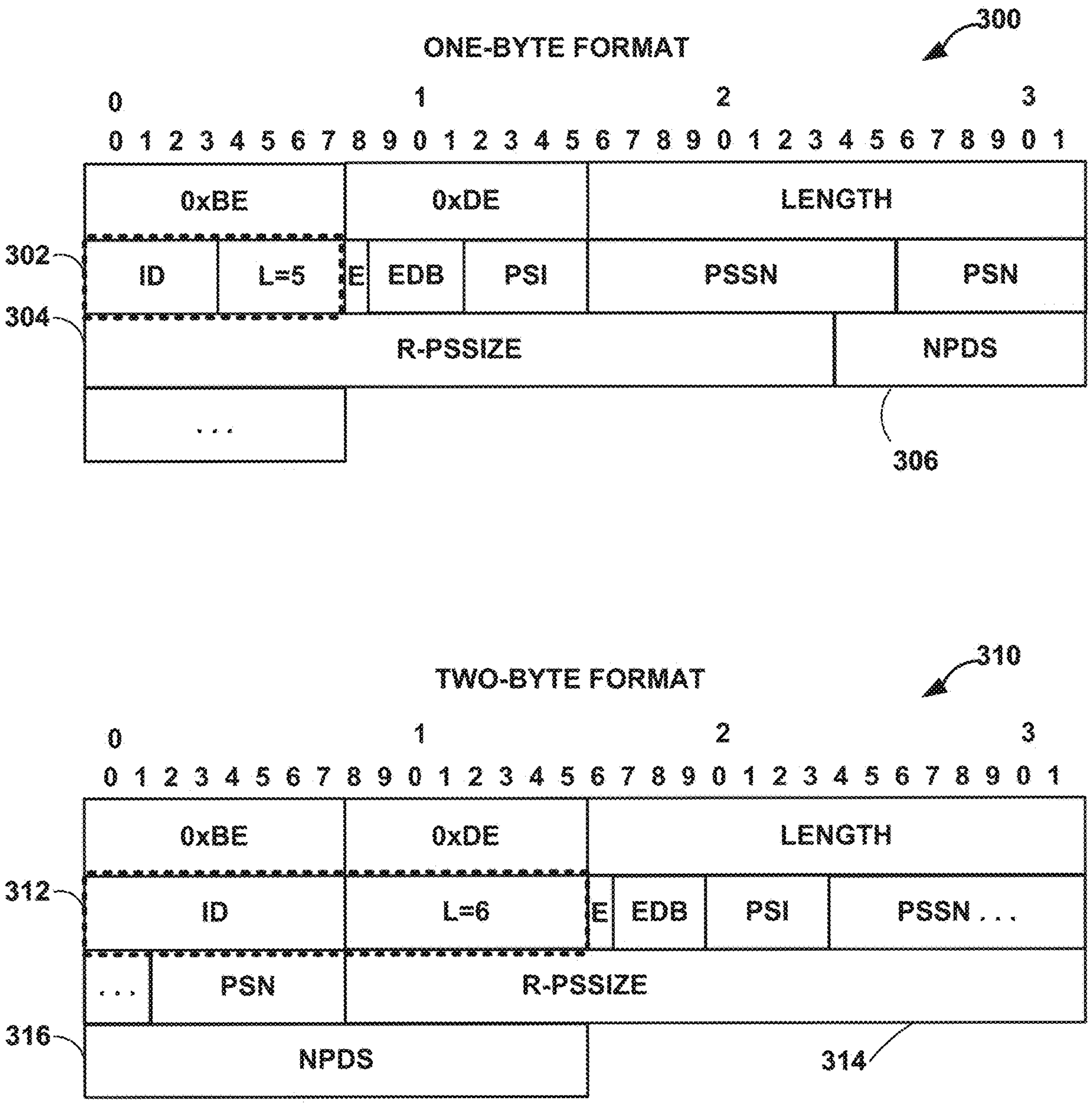
FIG. 4 is a conceptual diagram illustrating example RTP header extensions including R-PSSize elements according to one or more aspects of this disclosure.

FIG. 4 is a conceptual diagram illustrating example RTP header extensions including R-PSSize elements and number of PDUs in the PDU set (NPDS) elements according to one or more aspects of this disclosure. In the example of FIG. 4, RTP header extension 300 and RTP header extension 310 are depicted.

RTP header extension 300 may include a one-byte format header 302 (which may also be referred to herein as header extension element header 302). Header extension element header 302 may include an identifier (ID) field and an L field. RTP header extension 300 may include R-PSSize element 304. For example, header extension element header 302 may be one byte in length.

RTP header extension 310 may include a two-byte format header extension element header 312 of the header extension element including R-PSSize element 314. For example, header extension element header 312 may be two bytes in length.

In one example, R-PSSize element 304 or 314 may indicate a total size of the packets in the PDU set remaining to be sent from the viewpoint of the receiver (e.g., the total size of the packets in the PDU set not yet received). In such a case, the first PDU of a PDU set may include a value equal to PSSize minus the size of the first PDU as the R-PSSize and a last PDU of the PDU set may include a value of 0 as the R-PSSize. In another example, R-PSSize element 304 or 314 may indicate a total size of the PDU set yet to be consumed by the receiving device. In such a case, the first PDU of a PDU set may include a value equal to PSSize as the R-PSSize and a last PDU of the PDU set may include a value of the size of the last PDU as the R-PSSize.

RTP header extensions 300 and 310 may also each include a PSN field similar to PSN field 220 of FIG. 3 and a PSSN field similar to PSSN field 222 of FIG. 3. RTP header extension 300 may also include a number of PDUs in the PDU set (NPDS) field 306. NPDS field 306 may be 16 bits in length. The NPDS field 306 may represent a total number of PDUs belonging to the same PDU Set. In some examples, NPDS field 306 is an optional field that may be subject to an SDP signaling offer and answer negotiation, where the sending device may indicate whether it will provide the number of PDUs within the PDU set for a particular RTP stream. RTP header extension 310 may include NPDS field 316 which may be similar to NPDS field 306.

A computing device, such as client device 40 or server device 60 may add RTP header extension 300 or RTP header extension 310 to an RTP packet which may be a PDU of a PDU set. Such a computing device may determine a remaining PDU set size for a PDU set (e.g., the PDU set of which the RTP packet is part) and include a value in R-PSSize element 304 or R-PSSize element 314 that is indicative of a remaining PDU set size. For example, R-PSSize elements 304 and/or 314 may include a value from which gNB 120 and/or UPF 110 may determine the total size of the remaining PDUs in the PDU set of which a packet containing RTP header extension 300 or RTP header extension 310 is a member.

In some examples, the R-PSSize of a PDU set may be defined as the difference between the PSSize and the aggregate PSSize that has been consumed by the previous RTP packets that carry the PDUs of the PDU Set. In such a case, the first PDU of a PDU set may include a value equal to PSSize as the R-PSSize and a last PDU of the PDU set may include a value of the size of the last PDU as the R-PSSize.

In some examples, the R-PSSize of a PDU set may be defined as the difference between the PSSize and the aggregate PSSize that has been transmitted up until a currently received PDU of the PDU set. In such a case, the first PDU of a PDU set may include a value equal to PSSize minus the size of the first PDU as the R-PSSize and a last PDU of the PDU set may include a value of 0 as the R-PSSize.

For example, in the RTP header extension, such as RTP header extension 300 or 310, the RTP sending device may include a R-PSSize field (e.g., R-PSSize element 304 or 314). The value in the R-PSSize field of the first RTP packet of a given PDU set may be equal to the PSSize, thus providing the same information as is specified for PSSize in 3GPP TS 26.552 v0.0.21. However, the R-PSSize field in the other RTP packets (the RTP packets of the PDU set that follow the first RTP packet of the PDU set) provides additional information, e.g., size of the portion of the PDU set that is remaining to be sent (or consumed by the receiving device).

In some aspects, the PSSize field is re-interpreted or repurposed as the R-PSSize. The endpoints (e.g., computing devices) may negotiate the use of the re-interpretation. The negotiation may be performed via SDP messages.

Figure 5:
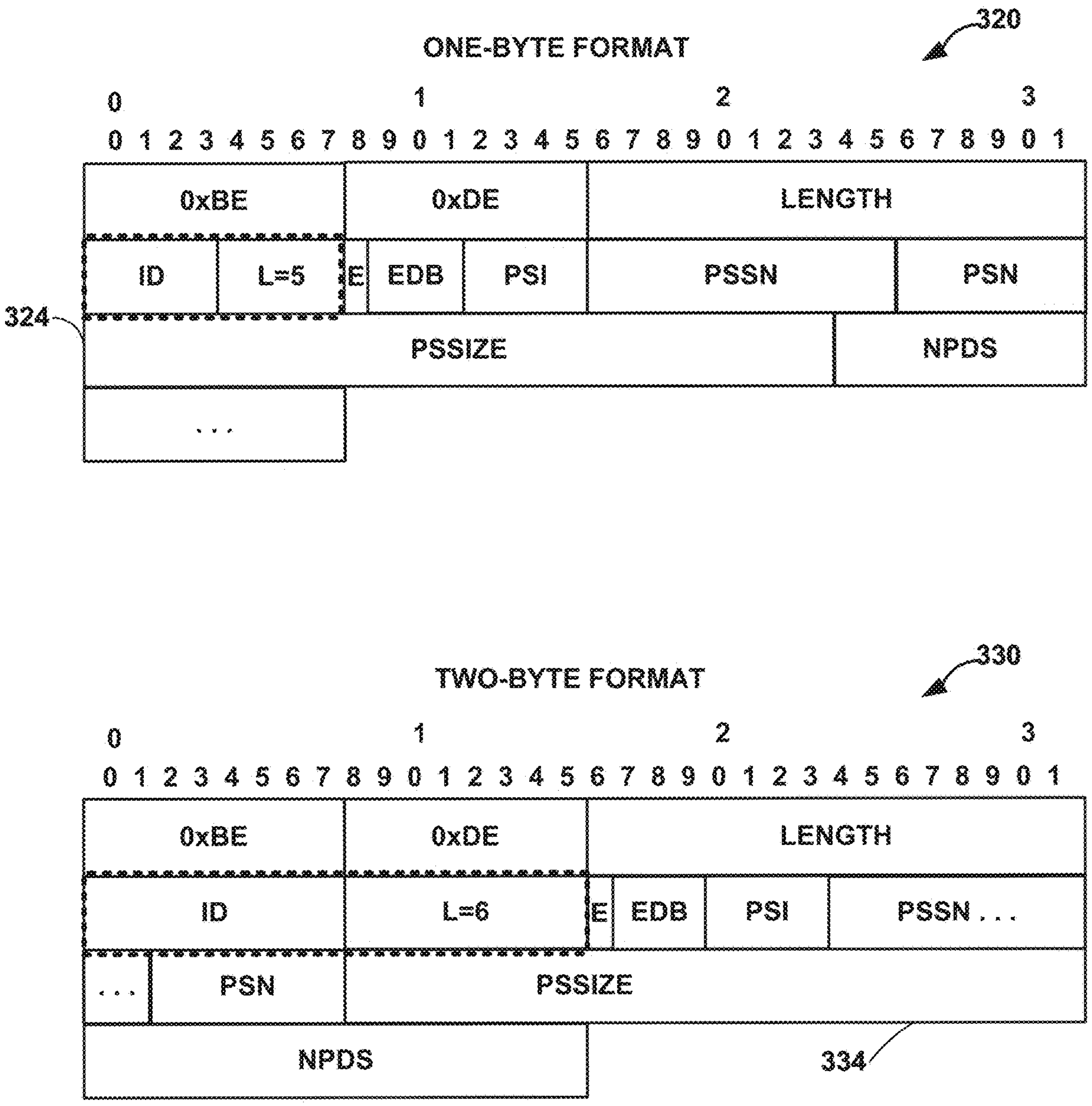
FIG. 5 is a conceptual diagram illustrating example RTP header extensions including a PSSize element which may be reinterpreted as a R-PSSize element according to one or more aspects of this disclosure.

FIG. 5 is a conceptual diagram illustrating example RTP header extensions including a PSSize element which may be reinterpreted as a R-PSSize element according to one or more aspects of this disclosure. RTP header extensions 320 and 330 may be similar to RTP header extensions 300 and 310, respectively, but rather than including R-PSSize elements, RTP header extensions 320 and 330 may include PSSize elements. For example, RTP header extension 320 may include PSSize element 324 and RTP header extension 330 may include PSSize element 334. Computing devices, such as client device 40 and server device 60, may negotiate reinterpreting a PSSize element 324 or 334 as conveying information which may be indicative of R-PSSize. For example, client device 40 and server device 60, may negotiate to include information that may otherwise be included in R-PSSize element 304 or 314 of FIG. 4 in PSSize element 324 or 334.

Endpoint devices, like client device 40 and server 60 may signal and agree upon the reinterpretation of PSSize element 324 or 334, for example, via SDP signaling. For example, an SDP attribute, such as a=extmap:7 urn:3gpp:pdu-set-marking:rel-18 short pdu-set-size, may be used to indicate that the PSSize element includes information that is indicative of the size of all the PDUs in the PDU Set, whereas an SDP attribute, such as a-extmap:7 urn:3gpp:pdu-set-marking:rel-19 short pdu-set-size, may be used to indicate that the PSSize element includes information that is indicative of the remaining PDU Set size (R-PSSize).

In one example, augmented Backus-Naur form (ABNF) syntax includes at least:

```
extensionname = "urn:3gpp:pdu-set-marking:rel-19"
extensionattributes = * 3(format / "pdu-set-size" / "num-pdus-in-pdu-set")
format = "short" / "long"
```

where "urn:3gpp:pdu-set-marking:rel-19" means the PSSize field in the PDU Set Marking RTP header extension is re-interpreted as the R-PSSize.

In another example, ABNF syntax includes at least:

```
extensionname = "urn:3gpp:pdu-set-marking:rel-19"
extensionattributes = * 3(format / "pdu-set-size" / "num-pdus-in-
pdu-set" / "pssize-re-interpreted")
format = "short" / "long"
```

where the presence of the RTP header extension attribute "pssize-re-interpreted" means that the PSSize field in the PDU Set Marking RTP header extension is re-interpreted as the R-PSSize; if it is absent, then the PSSize field in the PDU Set Marking RTP header extension is not re-interpreted.

In some cases, intervening network devices between the RTP sending device and the RTP receiving device may change an RTP packet or split an RTP packet sent by the RTP sending device to the RTP receiving device. This may change an actual size of a PDU set from what may be represented in the R-PSSize field of the first RTP packet of the PDU set. Thus, the intervening network device(s) may introduce an error that may negatively affect the resource allocation performed by the RTP receiving device. As such, it may be desirable to determine such changes and for an RTP receiving device to take such changes into account when allocating resources.

For example, an intervening network device may perform network address translation (NAT), such as NAT46 and/or NAT64. With NAT46, an incoming IP packet with an IPV4 address is converted to an IP packet with an IPV6 address. Such a translation changes a total packet size of the RTP packet because there is a difference in the size of an IP packet header for IPV4 and IPV6. Similarly, with NAT64 an incoming IP packet with an IPV6 address is converted to an IP packet with an IPv4 address which also changes a total packet size of the RTP packet.

In another example, with Traversal Using Relays around NAT (TURN), a TURN server may add a Simple Traversal of User Datagram Protocol through NATs (STUN) message header, a STUN attribute, and transport address. This increases the header size of the RTP packet.

According to the techniques of this disclosure, the RTP receiving device may calculate a PSSize (which may potentially fix an error). In some examples, the RTP receiving device may calculate the PSSize by adding the R-PSSize of the initial PDU within the PDU set and the size of the initial PDU. In some examples, the RTP receiving device may derive that the PSSize is equal to the R-PSSize of the initial PDU within the PDU set. In some aspects, the RTP receiving device is a network device between the application endpoints. In some aspects, the RTP receiving device is a User Plane Function (UPF). In some aspects, the RTP receiving device is a base station.

The difference in R-PSSize between two adjacent PDUs gives the indicated size of one of the adjacent PDUs. In some examples, if the R-PSSize excludes the size of the PDU that carries the R-PSSize, the one of the adjacent PDUs is the later PDU of the adjacent PDUs. In some examples, if the R-PSSize includes the size of the PDU that carries the R-PSSize, the one of the adjacent PDUs is the earlier PDU of the adjacent PDUs. The error in the size of a PDU may be calculated as the difference between the observed or actual size of the PDU received by the RTP receiving device and the indicated size of the PDU. The RTP receiving device may determine a PSSize correction. The PSSize correction may be equal to the difference times the number of PDUs in the PDU Set. The RTP receiving device may then use the PSSize correction when allocating resources for the RTP packet and/or for any or all of the remaining RTP packets in the PDU set.

The PSSize correction=(the difference)×(the number of PDUs in the PDU Set). In some examples, the number of PDUs in the PDU Set (NPDS), is a 16-bit field, that is added to the RTP header extension for PDU Set Marking as an optional field. The use of this NPDS optional field may be negotiated between the RTP sending device and the RTP receiving device.

In some examples, during a session setup (e.g., via SDP), the RTP sending device (e.g., client device 40) and the RTP receiving device (e.g., server device 60) may negotiate the use of R-PSSize and/or NPDS in the RTP header extension. In some examples, during a session setup (e.g., via SDP), the RTP sending device (e.g., client device 40) and the RTP receiving device (e.g., server device 60) may negotiate the use of a one-byte or two-byte RTP header extension element header (e.g., RTP header extension element header 302 or 312).

Figure 6:
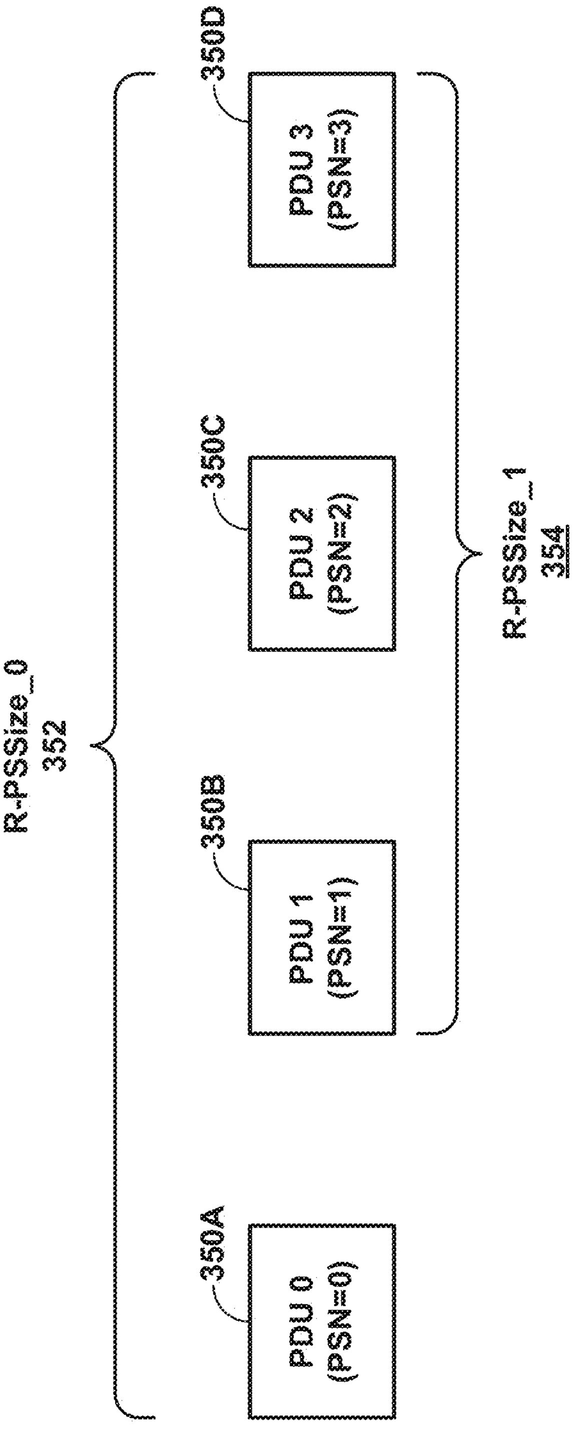
FIG. 6 is a conceptual diagram illustrating an example PDU set according to one or more aspects of this disclosure.

FIG. 6 is a conceptual diagram illustrating an example PDU set according to one or more aspects of this disclosure.

In the example of FIG. 6, PDUs 350A-350D are depicted, collectively forming PDU set 350. PDU 0 350A may represent a first PDU of PDU set 350 and may include a PSN of 0 identifying PDU 0 350A as the first PDU of PDU set 400. PDU 1 350B may represent a second PDU of PDU set 350 and may include a PSN of 1 identifying PDU 1 350B as the second PDU of PDU set 350. PDU 2 350C may represent a third PDU of PDU set 350 and may include a PSN of 2 identifying PDU 2 350C as the third PDU of PDU set 350. PDU 3 350D may represent a last PDU of PDU set 350 and may include a PSN of 3 identifying PDU 3 350D as the fourth PDU of PDU set 350.

For example, the total size (PSSize) of PDU set 350 may be 4000 bytes. Each of PDUs 350A-350D may have a size of 1000 bytes. The R-PSSize element 304 or 314 of PDU 0 350A (R-PSSize_0 352) may include an indication of 4000 bytes which may equal the size of PDUs 350A-350D. Similarly, the PSSize element 304 or 314 of PDU 1 350B (R-PSSize_1 354) may include an indication of 3000 bytes which may equal the total size of PDUs 350B-350D, remaining to be sent by the sending device, instead of the PSSize of 4000 bytes.

In some examples, a receiving device (e.g., client device 40 or server device 60) may compare the indicated size of a PDU (by taking the difference in the R-PSSize between two adjacent PDUs) and the observed size of the PDU and derive a PSSize error due to network operations such as NAT46/64 that may alter the PSSize. For example, a NAT46 device may be in network 74 between client device 40 and server device 60. Server device 60 may be unaware of the NAT46 device. Client device 40 may derive the indicated size of PDU 1 350A by taking the difference between the R-PSSize indicated in PDU 0 350A (R-PSSize_0 352) and the R-PS-Size indicated in PDU 1 350B (R-PSSize_1 352). For example, client device 40 may determine 4000–3000=1000 bytes. If client device 40 determines that PDU 350A has an actual size of 1020 bytes, client device 40 may determine a PDU size error of 20 bytes. For example, PDU size error=(observed size of PDU 1)–(indicated PDU size of PDU1). Client device 40 may then add 20 bytes for each PDU in PDU set 350 to get the actual PSSize. For example, client device 40 may determine a correction to be equal to the PDU size error times the number of PDUs in the PDU set. For example, 20 bytes×4=80 bytes. Client device 40 may determine an actual PSSize=(indictated PSSize)–(correction). For example, the actual PSSize may be used when determining resource allocation.

Figure 7:
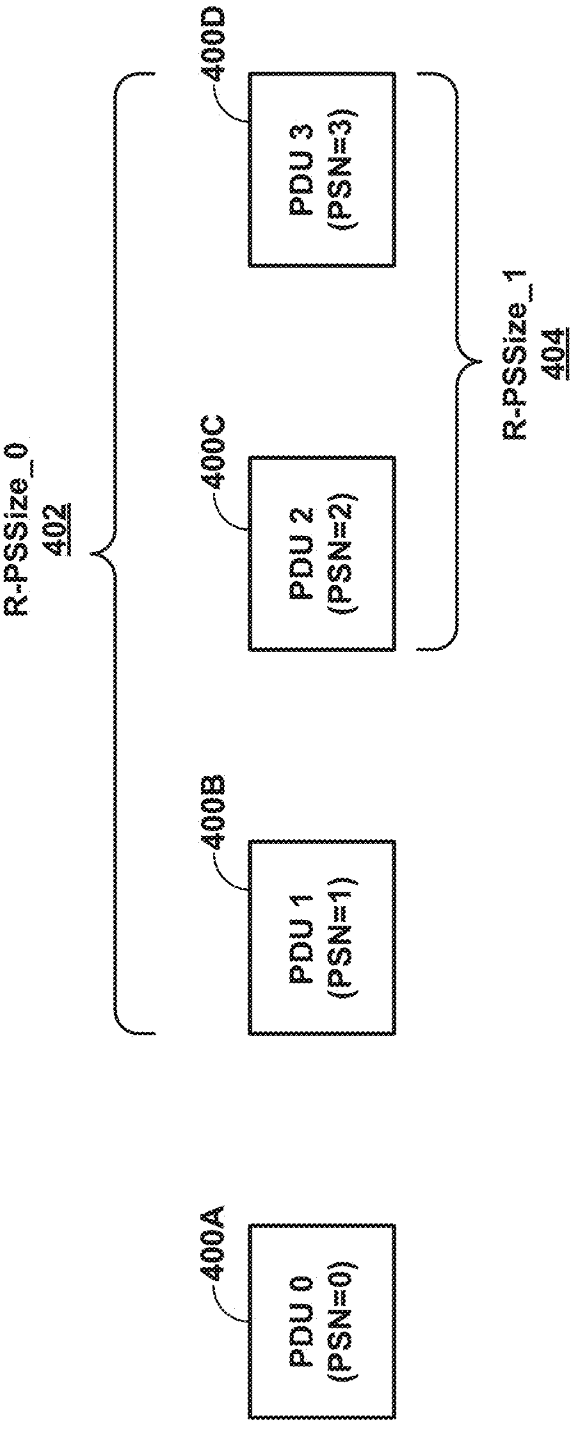
FIG. 7 is a conceptual diagram illustrating another example PDU set according to one or more aspects of this disclosure.

FIG. 7 is a conceptual diagram illustrating another example PDU set according to one or more aspects of this disclosure. In the example of FIG. 7, PDUs 400A-400D are depicted, collectively forming PDU set 400. PDU 0 400A may represent a first PDU of PDU set 400 and may include a PSN of 0 identifying PDU 0 400A as the first PDU of PDU set 400. PDU 1 400B may represent a second PDU of PDU set 400 and may include a PSN of 1 identifying PDU 1 400B as the second PDU of PDU set 400. PDU 2 400C may represent a third PDU of PDU set 400 and may include a PSN of 2 identifying PDU 2 400C as the third PDU of PDU set 400. PDU 3 400D may represent a last PDU of PDU set 400 and may include a PSN of 3 identifying PDU 3 400D as the fourth PDU of PDU set 400.

For example, the total size (PSSize) of PDU set 400 may be 4000 bytes. Each of PDUs 400A-400D may have a size of 1000 bytes. The R-PSSize element 304 or 314 of PDU 0 400A (R-PSSize_0 402) may include an indication of 3000 bytes which may equal the total size of PDUs 400B-400D, remaining to be sent by the sending device, instead of the PSSize of 4000 bytes. Similarly, the PSSize element 304 or 314 of PDU 1 400B (R-PSSize_1 402) may include an indication of 2000 bytes which may equal the total size of PDUs 402C-402D, remaining to be sent by the sending device, instead of the PSSize of 4000 bytes.

In some examples, a receiving device (e.g., client device 40 or server device 60) may compare the indicated size of a PDU (by taking the difference in the R-PSSize between two adjacent PDUs) and the observed size of the PDU and derive a PSSize error due to network operations such as NAT46/64 that alter the PSSize. For example, a NAT46 device may be in network 74 between client device 40 and server device 60. Server device 60 may be unaware of the NAT46 device. Client device 40 may derive the indicated size of PDU 1 400B by taking the difference between the R-PSSize indicated in PDU 0 400A (R-PSSize_0 402) and the R-PSSize indicated in PDU 1 400B (R-PSSize_1 402). For example, client device 40 may determine 3000–2000=1000 bytes. If client device 40 determines that PDU 400B has an actual size of 1020 bytes, client device 40 may determine a PDU size error of 20 bytes. For example, PDU size error=indicated PDU size of PDU1)–(observed size of PDU1). Client device 40 may then add 20 bytes for each PDU in PDU set 400 to get the actual PSSize. For example, client device 40 may determine an actual PSSize=(indictated PSSize)–(PDU size error)×(number of PDUs in the PDU set). For example, the actual PSSize may be used when determining resource allocation.

Figure 8:
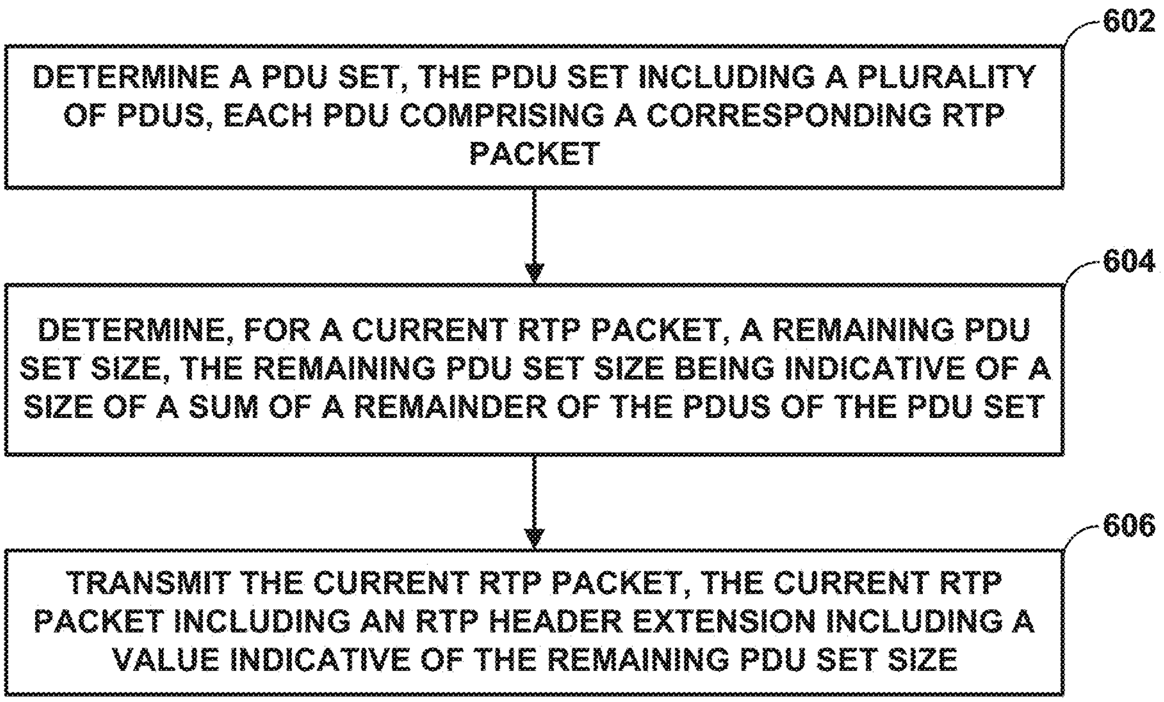
FIG. 8 is a flow diagram illustrating example transmitting device RTP remaining protocol data unit set size techniques according to one or more aspects of this disclosure.

FIG. 8 is a flow diagram illustrating example transmitting device RTP remaining protocol data unit set size techniques according to one or more aspects of this disclosure. While the techniques of FIG. 8 are described with respect to client device 40, the techniques of FIG. 8 may be practiced by any of the computing devices described herein or any other computing device capable of doing so.

Client device 40 may determine a PDU set, the PDU set including a plurality of PDUs, each PDU including a corresponding RTP packet (602). For example, client device 40 may determine that a frame of video data that is to be transmitted by client device 40 should be divided into a plurality of packets. Such packets may be RTP packets and may belong to PDU set 400.

Client device 40 may determine, for a current RTP packet of the PDU set, a remaining PDU set size, the remaining PDU set size being indicative of a size of a sum of a remainder of the PDUs of the PDU set (604). For example, client device 40 may, for PDU 0 350A, determine R-PS-Size_0 352, which may represent a sum of the sizes of PDU 0 350A, PDU 1 350B, PDU 2 350C, and PDU 3 350D. In another example, client device 40 may, for PDU 0 400A, determine R-PSSize_0 402 which may represent a sum of the sizes of PDU 1 400B, PDU 2 400C, and PDU 3 400D.

Client device 40 may transmit the current RTP packet, the current RTP packet including an RTP header extension including a value indicative of the remaining PDU set size (606). For example, client device 40 may transmit PDU 0 350A, and PDU 0 350A may include header extension 300 or 310 which includes R-PSSize element 304 or 314, respectively. In another example, client device 40 may transmit PDU 0 400A, and PDU 0 400A may include header extension 300 or 310 which includes R-PSSize element 304 or 314, respectively.

In some examples, the remainder of the PDUs comprises a current PDU and those PDUs of the PDU set to be transmitted after the current PDU, wherein the current PDU corresponds to the current RTP packet. In some examples, the remainder of the PDUs comprises those PDUs of the PDU set to be transmitted after the current PDU.

In some examples, the value indicative of the remaining PDU set size includes a number of bytes. In some examples, the RTP header extension further includes a header extension element header having a length of at least one-byte. In some examples, the header extension element header includes an identifier and a length indicator, wherein the identifier is indicative of the RTP header extension including the value indicative of the remaining PDU set size, and wherein the length indicator is indicative of the length of the header extension element.

In some examples, client device 40 may, prior to transmitting the RTP packet, negotiate, with a second computing device, the use of the RTP header extension. In some examples, the header extension element header comprises an identifier and a length indicator, wherein the identifier is indicative of the RTP header extension including a value indicative of a PDU set size reinterpreted as the remaining PDU set size, and wherein the length indicator is indicative of the length of the header extension element. In some examples, negotiating the use of the RTP header extension comprises negotiating the reinterpretation of the PDU set size to the remaining PDU set size.

In some examples, client device 40 may determine a count of a number PDUs in the PDU set, wherein the RTP header extension further includes the count of the number of PDUs in the PDU set.

In some examples, the remaining PDU set size is a first remaining PDU set size and the RTP header extension is a first RTP header extension. In some examples, client device 40 may determine, for a second RTP packet of the PDU set, a second remaining PDU set size. For example, client device 40 may determine for PDU 1 350B, a second PDU set size, e.g., R-PSSize_1 354. The second remaining PDU set size being indicative of the size of the sum of the remainder of the PDUs of the PDU set minus a size of the first PDU. For example, R-PSSize_1 354 may be equal to a sum of the size of PDU 1 350B, PDU 2 350C, and PDU 3 350D. In some examples, client device 40 may transmit the second RTP packet, the second RTP packet including a second RTP header extension including a value indicative of the second remaining PDU set size.

Figure 9:
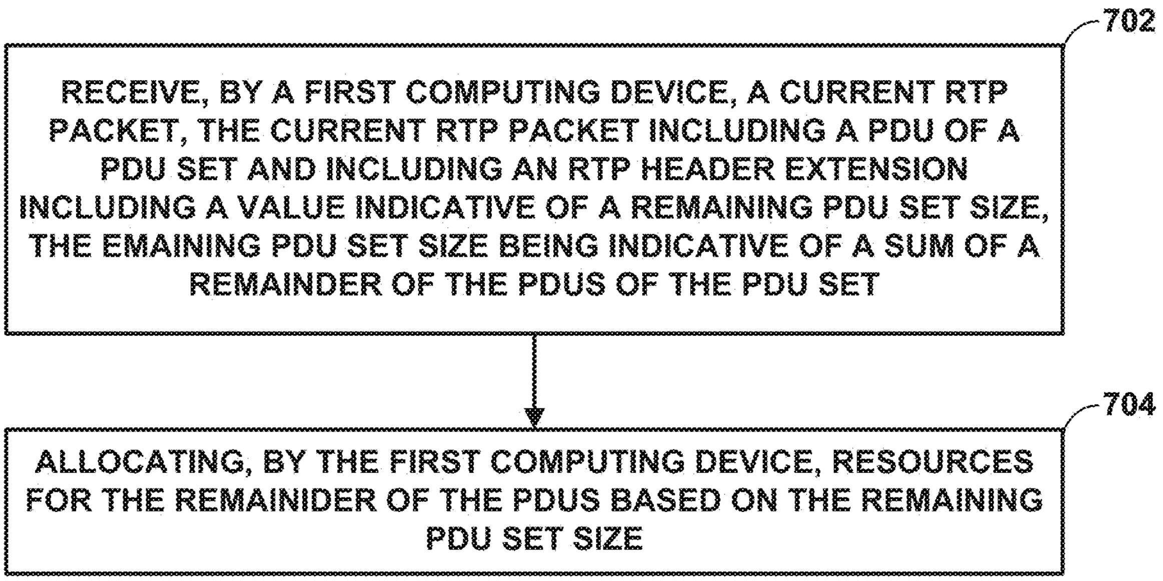
FIG. 9 is a flow diagram illustrating example receiving device RTP remaining protocol data unit set size techniques according to one or more aspects of this disclosure.

FIG. 9 is a flow diagram illustrating example receiving device RTP remaining protocol data unit set size techniques according to one or more aspects of this disclosure. While the techniques of FIG. 9 are described with respect to gNB 120, the techniques of FIG. 9 may be practiced by any of the computing devices described herein or any other computing device capable of doing so.

gNB 120 may receive a current RTP packet, the current RTP packet including a PDU of a PDU set and including an RTP header extension comprising a value indicative of a remaining PDU set size, the remaining PDU set size being indicative of a size of a sum of a remainder of the PDUs of the PDU set (702). For example, gNB 120 may receive PDU 350A, which may be an RTP packet of PDU set 350. PDU 350A may include RTP header extension 300 or 310 which may include R-PSSize element 304 or 314. R-PSSize element 304 or 314 may include the value indicative of a remaining PDU set size. The remaining PDU set size may be a sum of sizes of PDU 0 350A, PDU 1 350B, PDU 2 350C, and PDU 350D. In another example, gNB 120 may receive PDU 0 400A, which may be an RTP packet of PDU set 400. PDU 400A may include RTP header extension 300 or 310 which may include R-PSSize element 304 or 314. R-PSSize element 304 or 314 may include the value indicative of a remaining PDU set size. The remaining PDU set size may be a sum of sizes of PDU 1 400B, PDU 2 400C, and PDU 400D.

gNB 120 may allocate resources for the remainder of the PDUs based on the remaining PDU set size (704). For example, gNB 120 may allocate more resources or prioritize processing and/or transmission of PDUs to those RTP packets whose remaining PDU set size is lower than other RTP packets.

In some examples, the remainder of the PDUs comprises a current PDU and those PDUs of the PDU set to be transmitted after the current PDU, wherein the current PDU corresponds to the current RTP packet. In some examples, the remainder of the PDUs comprises those PDUs of the PDU set to be transmitted after the current PDU.

In some examples, the remaining PDU set size includes a number of bytes. In some examples, the RTP header extension includes a header extension element header having a length of at least one-byte. In some examples, the header extension element header includes an identifier and a length indicator, wherein the identifier is indicative of the RTP header extension including the value indicative of the remaining PDU set size, and wherein the length indicator is indicative of the length of the header extension element.

In some examples, prior to receiving the RTP packet, gNB 120 may negotiate, with the second computing device, the use of the RTP header extension. In some examples, negotiating the use of the RTP header extension includes negotiating a size of a header extension element header of the second RTP header extension.

In some examples, the RTP header extension further includes a count of a number of PDUs in the PDU set. In some examples, the remaining PDU set size is a first remaining PDU set size, the value is a first value, and the RTP header extension is a first RTP header extension. In some examples, gNB 120 may receive a second RTP packet of the PDU set, the second RTP packet including a second RTP header extension including a second value indicative of a second remaining PDU set size. For example, gNB 120 may receive PDU 1 350B. PDU 1 350B may include header extension 300 or 310 which may include R-PSSize element 304 or 314. R-PSSize element 304 or 314 of PDU 1 350B may include a value indicative of R-PSSize_1 350 (e.g., a sum of the size of PDU 1 350B, PDU 2 350C, and PDU 3 350D). In some examples, the second remaining PDU set size is indicative of the size of the remainder of the PDUs of the PDU set minus a size of the first PDU. For example, R-PSSize_1 354 may be equal to R-PSSize_0 352 minus a size of PDU 0 350A. In some examples, the PDU sequence number of the second RTP packet is greater than the PDU sequence number of the first RTP packet by 1. In some examples, gNB 120 may subtract the second value from the first value to determine an indicated size of the first PDU. In some examples, gNB 120 may determine an actual size of the first PDU. In some examples, gNB 120 may determine a difference equal to the actual size of the first PDU minus the indicated size of the first PDU. In some examples, gNB 120 may add a product of the difference and the count of the number of PDUs in the PDU set to the remaining PDU set size to determine an actual size of the PDU set. For example, gNB 120 may determine Actual PSSize=(indicated PSSize)−(PDU size error)×(number of PDUs in the PDU set).

In some examples, the remaining PDU set size is a first remaining PDU set size and the RTP header extension is a first RTP header extension. In some examples, gNB 120 may receive a second RTP packet of the PDU set, including a second RTP header extension including a value indicative of a second remaining PDU set size. For example, gNB 120 may receive PDU 1 400B. PDU 1 400B may include header extension 300 or 310 which may include R-PSSize element 304 or 314. R-PSSize element 304 or 314 of PDU 1 400B may include a value indicative of R-PSSize_1 404 (e.g., a sum of the size of PDU 2 400C and PDU 3 400D). In some examples, the second remaining PDU set size is indicative of the size of the sum of the remainder of the PDUs of the PDU set minus a size of the second RTP packet a remaining PDU set size. For example, R-PSSize_1 404 may be equal to R-PSSize_0 402 minus a size of PDU 1 400B. In some examples, gNB 120 may allocate resources for the current RTP packet based on the second remaining PDU set size.

Various examples of the techniques of this disclosure are summarized in the following clauses.

Clause 1A. A method comprising: determining, a protocol data unit (PDU) set size, the PDU set size being indicative of a total size of all PDUs belonging to the PDU set; determining, a remaining PDU set size, the remaining PDU set size being indicative of a remaining total size of all PDUs belonging to the PDU set, the remaining total size including a size of all PDUs of the PDU set not yet transmitted; and transmitting a current real-time transport protocol (RTP) packet, the current RTP packet comprising a current RTP header extension comprising a value indicative of the remaining PDU set size.

Clause 2A. The method of clause 1A, further comprising prior to transmitting the current RTP packet, transmitting a previous RTP packet, the previous RTP packet comprising a previous RTP header extension comprising a value indicative of the PDU set size.

Clause 3A. The method of clause 1A or clause 2A, wherein the current RTP header extension comprises a header extension element header of at least one-byte.

Clause 4A. The method of any of clauses 1A-3A, wherein the header extension element header comprises an identifier and a length indicator, the length indicator being indicative of the length of the header extension element.

Clause 5A. The method of any of clauses 1A-4A, further comprising prior to transmitting the current RTP packet, negotiating the use of the current RTP header extension comprising the value indicative of the remaining PDU set size.

Clause 6A. The method of clause 5A, wherein negotiating the use of the current RTP header extension comprising the value indicative of the remaining PDU set size comprises negotiating a size of a header extension element header of the current RTP header extension.

Clause 7A. The method of any of clauses 1A-6A, further comprising determining a count of a number PDUs in the PDU set, wherein the RTP header extension further comprises the count of the number of PDUs in the PDU set.

Clause 8A. A method comprising: receiving a real-time transport protocol (RTP) packet, the RTP packet comprising an RTP header extension comprising a value indicative of a remaining PDU set size; and allocating resources for the RTP packet based on the remaining PDU set size.

Clause 9A. The method of clause 8A, wherein the RTP header extension comprises a header extension element header having a length of at least one-byte.

Clause 10A. The method of clause 8A or clause 9A, wherein the header extension element header comprises an identifier and a length indicator, wherein the identifier is indicative of the RTP header extension including the value indicative of the remaining PDU set size, and wherein the length indicator is indicative of the length of the header extension element.

Clause 11A. The method of any of clauses 8A-10A, further comprising prior to receiving the RTP packet, negotiating the use of the RTP header extension.

Clause 12A. The method of clause 11A, wherein negotiating the use of the RTP header extension comprises negotiating a size of a header extension element header of the second RTP header extension.

Clause 13A. The method of any of clauses 8A-12A, wherein the RTP header extension further comprises a count of a number of PDUs in the PDU set.

Clause 14A. The method of clause 13A, wherein the RTP packet is a first RTP packet, the RTP header extension is a first RTP header extension, and the value is a first value, the method further comprising: receiving a second RTP packet comprising a second RTP header extension, the second RTP header extension comprising a second value indicative of the remaining PDU set size, the second value being less than the first value; subtracting the second value from the first value to determine an indicated size of a first PDU, the first PDU corresponding to the first RTP packet; determining an actual size of the first PDU; determining a difference between the actual size of the first PDU and the indicated size of the first PDU; and subtracting a product of the difference and the count of the number of PDUs in the PDU set from the remaining PDU set size to determine an actual size of the PDU set.

Clause 15A. A computing device, comprising: memory configured to store a current real-time transport protocol (RTP) packet; and one or more processors coupled to the memory, the one or more processors being configured to perform any method of clauses 1A-14A.

Clause 16A. A computer-readable storage medium having stored thereon instructions that, when executed, cause a processor to perform the method of any of clauses 1A-14A.

Clause 17A. A computing device comprising at least one means for performing the method of any of clauses 1A-14A.

Clause 1B. A method comprising: determining a protocol data unit (PDU) set, the PDU set comprising a plurality of PDUs, each PDU comprising a corresponding real-time transport protocol (RTP) packet; determining, for a current RTP packet of the PDU set, a remaining PDU set size, the remaining PDU set size being indicative of a size of a sum of a remainder of the PDUs of the PDU set; and transmitting the current RTP packet, the current RTP packet comprising an RTP header extension comprising a value indicative of the remaining PDU set size.

Clause 2B. The method of clause 1B, wherein the remainder of the PDUs comprises the current PDU and those PDUs of the PDU set to be transmitted after the current PDU, wherein the current PDU corresponds to the current RTP packet.

Clause 3B. The method of clause 1B, wherein the remainder of the PDUs comprises those PDUs of the PDU set to be transmitted after the current PDU.

Clause 4B. The method of any of clauses 1B-3B, wherein the value indicative of the remaining PDU set size comprises a number of bytes.

Clause 5B. The method of any of clauses 1B-4B, wherein the RTP header extension further comprises a header extension element header having a length of at least one-byte.

Clause 6B. The method of clause 5B, wherein the header extension element header comprises an identifier and a length indicator, wherein the identifier is indicative of the RTP header extension including the value indicative of the remaining PDU set size, and wherein the length indicator is indicative of the length of the header extension element.

Clause 7B. The method of clause 5B, wherein the header extension element header comprises an identifier and a length indicator, wherein the identifier is indicative of the RTP header extension including the value indicative of a PDU set size re-interpreted as the remaining PDU Set Size, and wherein the length indicator is indicative of the length of the header extension element.

Clause 8B. The method of any of clauses 1B-6B, further comprising prior to transmitting the RTP packet, negotiating, by a first computing device with a second computing device, the use of the RTP header extension.

Clause 9B. The method of clause 8B, wherein negotiating the use of the RTP header extension comprises negotiating re-interpretation of a PDU set size to the remaining PDU set size.

Clause 10B. The method of any of clauses 1B-9B, further comprising determining a count of a number PDUs in the PDU set, wherein the RTP header extension further comprises the count of the number of PDUs in the PDU set.

Clause 11B. The method of any of clauses 1B-10B, wherein the remaining PDU set size is a first remaining PDU set size and the RTP header extension is a first RTP header extension, the method further comprising: determining, for a second RTP packet of the PDU set, a second remaining PDU set size, the second remaining PDU set size being indicative of the size of the sum of the remainder of the PDUs of the PDU set minus a size of a first PDU; and transmitting the second RTP packet, the second RTP packet comprising a second RTP header extension comprising a value indicative of the second remaining PDU set size.

Clause 12B. A method comprising: receiving, by a first computing device, a current real-time transport protocol (RTP) packet, the current RTP packet comprising a protocol data unit (PDU) of a PDU set and comprising an RTP header extension comprising a value indicative of a remaining PDU set size, the remaining PDU set size being indicative of a size of a sum of a remainder of the PDUs of the PDU set; and allocating, by the first computing device, resources for the remainder of the PDUs packet based on the remaining PDU set size.

Clause 13B. The method of clause 12B, wherein the remainder of the PDUs comprises the current PDU and those PDUs of the PDU set to be transmitted after the current PDU, wherein the current PDU corresponds to the current RTP packet.

Clause 14B. The method of clause 12B, wherein the remainder of the PDUs comprises those PDUs of the PDU set to be transmitted after the current PDU.

Clause 15B. The method of any of clauses 12B-14B, wherein the remaining PDU set size comprises a number of bytes.

Clause 16B. The method of any of clauses 12B-15B, wherein the RTP header extension comprises a header extension element header having a length of at least one-byte.

Clause 17B. The method of clause 16B, wherein the header extension element header comprises an identifier and a length indicator, wherein the identifier is indicative of the RTP header extension including the value indicative of the remaining PDU set size, and wherein the length indicator is indicative of the length of the header extension element.

Clause 18B. The method of any of clauses 9B-17B, further comprising prior to receiving the RTP packet, negotiating, by the first computing device with the second computing device, the use of the RTP header extension.

Clause 19B. The method of any of clauses 9B-18B, wherein the RTP header extension further comprises a count of a number of PDUs in the PDU set.

Clause 20B. The method of any of clauses 12B-19B, wherein the remaining PDU set size is a first remaining PDU set size, the value is a first value, and the RTP header extension is a first RTP header extension, the method further comprising: receiving, by the first computing device, a second RTP packet of the PDU set, the second RTP packet comprising a second RTP header extension comprising a second value indicative of a second remaining PDU set size, the second remaining PDU set size being indicative of the size of the remainder of the PDUs of the PDU set minus a size of a first PDU, wherein the PDU sequence number of the second RTP packet is greater than the PDU sequence number of the first RTP packet by 1; the PDU set size; subtracting, by the first computing device, the second value from the first value to determine an indicated size of a first PDU; determining, by the first computing device, an actual size of the first PDU; determining, by the first computing device, a difference equal to the actual size of the first PDU minus the indicated size of the first PDU; and adding, by the first computing device, a product of the difference and the count of the number of PDUs in the PDU set to the indicated PDU set size to determine an actual size of the PDU set.

Clause 21B. The method of any of clauses 12B-20B, wherein the remaining PDU set size is a first remaining PDU set size and the RTP header extension is a first RTP header extension, the method further comprising: receiving, by the first computing device, a second RTP packet of the PDU set, comprising a second RTP header extension comprising a value indicative of a second remaining PDU set size, the second remaining PDU set size being indicative of the size of the sum of the remainder of the PDUs of the PDU set minus a size of the second RTP packet a remaining PDU set size; and allocating, by the first computing device, resources for the current RTP packet based on the second remaining PDU set size.

Clause 22B. A computing device comprising: one or more memories configured to store a real-time transport protocol (RTP) packet; and one or more processors coupled to the one or more memories, the one or more processors being configured to: determine a protocol data unit (PDU) set, the PDU set comprising a plurality of PDUs, each PDU comprising a corresponding RTP packet; determine, for a current RTP packet of the PDU set, a remaining PDU set size, the remaining PDU set size being indicative of a size of a sum of a remainder of the PDUs of the PDU set, the remainder of the PDUs being those PDUs of the PDU set to be transmitted after the current RTP packet; and transmit the current RTP packet, the current RTP packet comprising an RTP header extension comprising a value indicative of the remaining PDU set size.

Clause 23B. The device of clause 22B, wherein the remainder of the PDUs comprises the current PDU and those PDUs of the PDU set to be transmitted after the current PDU, wherein the current PDU corresponds to the current RTP packet.

Clause 24B. The device of clause 22B, wherein the remainder of the PDUs comprises those PDUs of the PDU set to be transmitted after the current PDU.

Clause 25B. The device of clause 18B, wherein the value indicative of the remaining PDU set size comprises a number of bytes.

Clause 26B. The device of any of clauses 22B-25B, wherein the one or more processors are further configured to, prior to transmitting the RTP packet, negotiate with another computing device, the use of the RTP header extension.

Clause 27B. A computing device comprising: one or more memories configured to store a real-time transport protocol (RTP) packet; and one or more processors coupled to the one or more memories, the one or more processors being configured to: receive a current RTP packet, the current RTP packet comprising a protocol data unit (PDU) of a PDU set and comprising an RTP header extension comprising a value indicative of a remaining PDU set size, the remaining PDU set size being indicative of a size of a sum of a remainder of the PDUs of the PDU set; and allocate resources for the remainder of the PDUs based on the remaining PDU set size.

Clause 28B. The device of claim 27B, wherein the remainder of the PDUs comprises the current PDU and those PDUs of the PDU set to be transmitted after the current PDU, wherein the current PDU corresponds to the current RTP packet.

Clause 29B. The device of clause 27B, wherein the remainder of the PDUs comprises those PDUs of the PDU set to be transmitted after the current PDU.

Clause 30B. The device of clause 25B or clause 26B, wherein the one or more processors are further configured to, prior to receiving the RTP packet, negotiate with the another computing device, the use of the RTP header extension.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:

determining a protocol data unit (PDU) set, the PDU set comprising a plurality of PDUs, each PDU comprising a corresponding real-time transport protocol (RTP) packet;

determining, for a current RTP packet of the PDU set, a remaining PDU set size, the remaining PDU set size being indicative of a size of a sum of a remainder of the PDUs of the PDU set; and transmitting the current RTP packet, the current RTP packet comprising an RTP header extension comprising a value indicative of the remaining PDU set size, wherein the RTP header extension further comprises a header extension element header having a length of at least one-byte and including an identifier and a length indicator, and wherein the identifier indicates a) that the RTP header extension includes the value indicative of the remaining PDU set size or b) that the RTP header extension includes a value indicative of a PDU set size re-interpreted as the remaining PDU set size.

2. The method of claim 1, wherein the remainder of the PDUs comprises a current PDU and a subset of the plurality of PDUs, each PDU of the subset of the plurality of PDUs to be transmitted after the current PDU, wherein the current PDU corresponds to the current RTP packet.

3. The method of claim 1, wherein the remainder of the PDUs comprises a subset of the plurality of PDUs, each PDU of the subset of the plurality of PDUs to be transmitted after a current PDU.

4. The method of claim 1, wherein the value indicative of the remaining PDU set size comprises a number of bytes.

5. The method of claim 1, wherein the length indicator is indicative of the length of the header extension element.

6. The method of claim 1, further comprising prior to transmitting the RTP packet, negotiating, by a first computing device with a second computing device, the use of the RTP header extension.

7. The method of claim 6, wherein negotiating the use of the RTP header extension comprises negotiating re-interpretation of a PDU set size to the remaining PDU set size.

8. The method of claim 1, further comprising determining a count of a number of PDUs in the PDU set, wherein the RTP header extension further comprises the count of the number of PDUs in the PDU set.

9. The method of claim 1, wherein the remaining PDU set size is a first remaining PDU set size and the RTP header extension is a first RTP header extension, the method further comprising:

determining, for a second RTP packet of the PDU set, a second remaining PDU set size, the second remaining PDU set size being indicative of the size of the sum of the remainder of the PDUs of the PDU set minus a size of a first PDU; and transmitting the second RTP packet, the second RTP packet comprising a second RTP header extension comprising a value indicative of the second remaining PDU set size.

10. A method comprising:

receiving, by a first computing device, a current real-time transport protocol (RTP) packet, the current RTP packet comprising a protocol data unit (PDU) of a PDU set and comprising an RTP header extension comprising a value indicative of a remaining PDU set size, the remaining PDU set size being indicative of a size of a sum of a remainder of the PDUs of the PDU set, wherein the RTP header extension further comprises a header extension element header having a length of at least one-byte and including an identifier and a length indicator, and wherein the identifier indicates a) that the RTP header extension includes the value indicative of the remaining PDU set size or b) that the RTP header extension includes a value indicative of a PDU set size re-interpreted as the remaining PDU set size; and allocating, by the first computing device, resources for the remainder of the PDUs based on the remaining PDU set size.

11. The method of claim 10, wherein the remainder of the PDUs comprises a current PDU and a subset of the plurality of PDUs, each PDU of the subset of the plurality of PDUs to be transmitted after the current PDU, wherein the current PDU corresponds to the current RTP packet.

12. The method of claim 10, wherein the remainder of the PDUs comprises a subset of the plurality of PDUs, each PDU of the subset of the plurality of PDUs to be transmitted after a current PDU.

13. The method of claim 10, wherein the remaining PDU set size comprises a number of bytes.

14. The method of claim 10, wherein the length indicator is indicative of the length of the header extension element.

15. The method of claim 10, further comprising prior to receiving the RTP packet, negotiating, by the first computing device with the second computing device, the use of the RTP header extension.

16. The method of claim 10, wherein the RTP header extension further comprises a count of a number of PDUs in the PDU set.

17. The method of claim 10, wherein the remaining PDU set size is a first remaining PDU set size, the value is a first value, and the RTP header extension is a first RTP header extension, the method further comprising:

receiving, by the first computing device, a second RTP packet of the PDU set, the second RTP packet comprising a second RTP header extension comprising a second value indicative of a second remaining PDU set size, the second remaining PDU set size being indicative of the size of the remainder of the PDUs of the PDU set minus a size of a first PDU, wherein a PDU sequence number of the second RTP packet is greater than a PDU sequence number of the current RTP packet by 1;

subtracting, by the first computing device, the second value from the first value to determine an indicated size of the first PDU;

determining, by the first computing device, an actual size of the first PDU;

determining, by the first computing device, a difference equal to the actual size of the first PDU minus the indicated size of the first PDU; and adding, by the first computing device, a product of the difference and the count of the number of PDUs in the PDU set to the indicated PDU set size to determine an actual size of the PDU set.

18. The method of claim 10, wherein the remaining PDU set size is a first remaining PDU set size and the RTP header extension is a first RTP header extension, the method further comprising:

receiving, by the first computing device, a second RTP packet of the PDU set, comprising a second RTP header extension comprising a value indicative of a second remaining PDU set size, the second remaining PDU set size being indicative of the size of the sum of the remainder of the PDUs of the PDU set minus a size of the second RTP packet a remaining PDU set size; and allocating, by the first computing device, resources for the current RTP packet based on the second remaining PDU set size.

19. A computing device comprising:

one or more memories configured to store a real-time transport protocol (RTP) packet; and one or more processors coupled to the one or more memories, the one or more processors being configured to:

determine a protocol data unit (PDU) set, the PDU set comprising a plurality of PDUs, each PDU comprising a corresponding RTP packet;

determine, for a current RTP packet of the PDU set, a remaining PDU set size, the remaining PDU set size being indicative of a size of a sum of a remainder of the PDUs of the PDU set; and transmit the current RTP packet, the current RTP packet comprising an RTP header extension comprising a value indicative of the remaining PDU set size, wherein the RTP header extension further comprises a header extension element header having a length of at least one-byte and including an identifier and a length indicator, and wherein the identifier indicates a) that the RTP header extension includes the value indicative of the remaining PDU set size or b) that the RTP header extension includes a value indicative of a PDU set size re-interpreted as the remaining PDU set size.

20. The device of claim 19, wherein the remainder of the PDUs comprises a current PDU and a subset of the plurality of PDUs, each PDU of the subset of the plurality of PDUs to be transmitted after the current PDU, wherein the current PDU corresponds to the current RTP packet.

21. The device of claim 19, wherein the remainder of the PDUs comprises a subset of the plurality of PDUs, each PDU of the subset of the plurality of PDUs to be transmitted after a current PDU.

22. The device of claim 19, wherein the value indicative of the remaining PDU set size comprises a number of bytes.

23. The device of claim 19, wherein the one or more processors are further configured to, prior to transmitting the RTP packet, negotiate with another computing device, the use of the RTP header extension.

24. A computing device comprising:

one or more memories configured to store a real-time transport protocol (RTP) packet; and one or more processors coupled to the one or more memories, the one or more processors being configured to:

receive a current RTP packet, the current RTP packet comprising a protocol data unit (PDU) of a PDU set and comprising an RTP header extension comprising a value indicative of a remaining PDU set size, the remaining PDU set size being indicative of a size of a sum of a remainder of the PDUs of the PDU set, wherein the RTP header extension further comprises a header extension element header having a length of at least one-byte and including an identifier and a length indicator, and wherein the identifier indicates a) that the RTP header extension includes the value indicative of the remaining PDU set size or b) that the RTP header extension includes a value indicative of a PDU set size re-interpreted as the remaining PDU set size; and allocate resources for the remainder of the PDUs based on the remaining PDU set size.

25. The device of claim 24, wherein the remainder of the PDUs comprises a current PDU and a subset of the plurality of PDUs, each PDU of the subset of the plurality of PDUs to be transmitted after the current PDU, wherein the current PDU corresponds to the current RTP packet.

26. The device of claim 24, wherein the remainder of the PDUs comprises a subset of the plurality of PDUs, each PDU of the subset of the plurality of PDUs to be transmitted after a current PDU.

27. The device of claim 24, wherein the one or more processors are further configured to, prior to receiving the RTP packet, negotiate with the another computing device, the use of the RTP header extension.

* * * * *